Oct. 22, 1940.                  H. SAUER                    2,219,116
                        ENLARGING AND COPYING DEVICE
                           Filed July 22, 1938
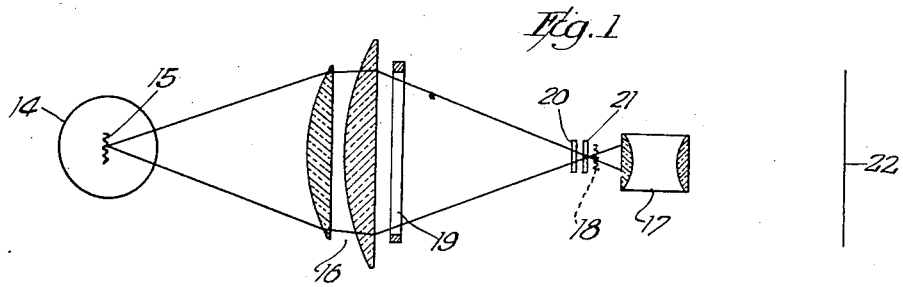
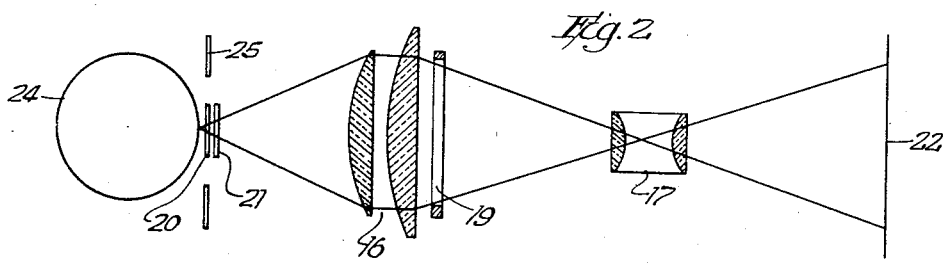
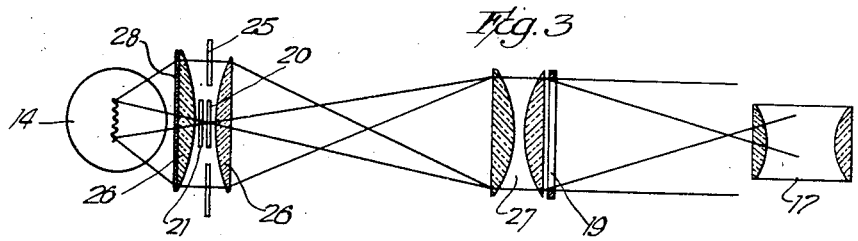
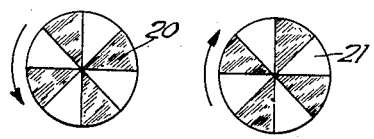
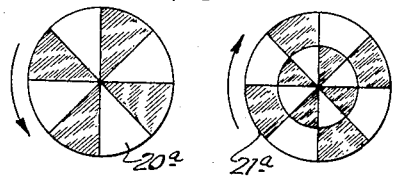
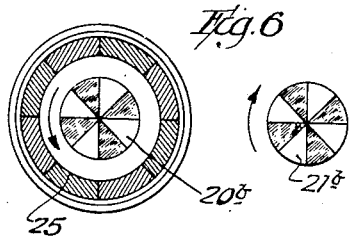
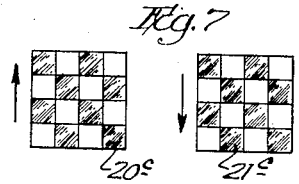
Inventor
Hans Sauer
by B. Singer & F. Stern
Attys.

Patented Oct. 22, 1940

2,219,116

UNITED STATES PATENT OFFICE 2,219,116

ENLARGING AND COPYING DEVICE

Hans Sauer, Dresden, Germany, assignor to Zeiss Ikon Aktiengesellschaft, Dresden, Germany Application July 22, 1938, Serial No. 220,804
In Germany July 30, 1937

8 Claims. (Cl. 88—24)

The invention relates to improvements in enlarging and copying devices.

At the present time principally two types of enlargers are used, namely the type which operates with so called directed light and the type which operates with diffused light. The difference between these two types consists in the following:

Enlargers employing directed light are provided with a source of light having a relatively small area. A condenser located between the source of light and the negative produces an image of the source of light approximately in the plane of the diaphragm of the enlarging objective. Enlargers employing diffused light usually maintain the negative in the opening of an Ulbricht sphere, or against an opal or frosted glass plate so that each element of the emulsion on the negative is illuminated by a beam of light whose aperture is substantially greater than the aperture at the objective of the enlarger. The employment of a greater aperture in the path of light does not by itself detrimentally influence the enlarging operation, but the light dispersing properties of the negative cause that light which strikes the negative at an oblique angle to affect the printing paper. Hence the printing paper is secondarily affected thereby, while it is primarily affected by the light coming through the enlarging objective. Owing to the superposition of this dispersed light over the light passing through the lens of the enlarger the contrasts in a negative are reproduced in weakened condition when enlargements are made by diffused light. The enlarged print will show a softer gradation of contrasts than a print produced by an enlarger in which the proportion of dispersed light is relatively negligible.

This effect of a greatly enlarged aperture for the source of light, inducing in the print a variation of the gradation of contrasts of the negative is well known in the art. Enlarger lamps are known which permit the relative proportions of the two types of light to be varied, for instance, by insertion of frosted or opal glass plate between the condenser lens system and the negative. In devices employing a condenser lens system it also had been suggested to place between a light source of a relative large luminous surface and the condenser a diaphragm of some kind, for instance a wire screen or a gray filter or the like. Size and location of this diaphragm device were selected in such manner that an image of this diaphragm device was produced by the condenser lens within the diaphragm aperture of the enlarging objective itself. Since obviously the lamp emitted diffused light as well as directed light, this diaphragm, whose image was produced in the objective had the principal effect of cutting down the directed light so that the proportion of the diffused light in the total light passing through the enlarging objective became greater, with the result that a softer density gradation is obtained in the print.

The opposite effect, namely producing a print with strong contrasts, may be attained by positioning in front of the large luminous surface—represented for instance by an opal lamp—an iris diaphragm and adjusting the diaphragm to a relatively small stop, thereby cutting out a portion of the diffused light, while a relatively greater proportion of the directed light passed through the same.

It is also known to make use of a lamp with a relatively small luminous surface and to produce by means of a condenser lens system an image of this surface somewhere near the enlarging objective by the directed light. It is then possible to suppress by means of suitable located diaphragm this image of the light source. On the other hand, an annular diaphragm may be used which surrounds the image of source of the light, whereby the diffused light is predominately weakened. Both diaphragms may be used, one after the other, and it is then possible to produce from the same negative in one case a print by predominately directed light and in the other case a print by predominately diffused light.

It is now an object of the present invention to provide enlarging and copying devices in which the equipment consists in a known way of a source of illumination, one or more condenser lenses, a negative, and an objective for producing a print of the negative on some light sensitive copying material. The invention additionally provides means for selectively varying the ratio of the intensity of light diffused by the negative to the ratio of light passing directly through the same to the objective.

Another object of the invention is to provide selectively variable means for the purpose mentioned, comprising two or more members constructed to absorb partly or entirely the photochemically active light rays.

The present invention hence also has the object of permitting the ratio of intensity of directed light passing to the objective to the ratio of diffused light to be varied gradually or continually between a maximum and minimum for each kind of light. Thus it is possible to vary the gradation of contrasts in the print until the desired result is accurately obtained, independent of the possibilities offered by the gradation in the negative.

The devices of the prior art solely permitted an interrupted step by step variation, not a gradual continuous variation between maximum and minimum intensities of "diffused" and "directed" light, since the variation was effected by positioning different diaphragms in front of the source of light or by making a number of successive exposures, to different light for different lengths of time.

Another object of the invention consists in constructing these light influencing means in the form of "process" screens, screen diaphragms, sector diaphragms or the like, arranged in pairs and adjustable relatively to each other so that the uniformity of the illumination of the negative is hardly interfered with. In condenser lens systems as practically used it is not feasible to meet the theoretical requirement of producing an image of the source of illumination through every surface element of the condenser lens in one single place only of the diaphragm plane of the enlarging objective; this demand is particularly not met where the enlarger is used to produce at different times enlargements of different magnifications. As a rule only an approximate axial symmetry is obtainable, and any change in the enlarging ratio is usually disregarded. Hence, whenever the image of a small luminous surface in the neighborhood of the enlarging objective is covered more or less by diaphragms, the picture appearing on the copying material can not be illuminated uniformly. This defect which is noticeable in the devices of the prior art is overcome by the present invention. For this purpose the screening effect of the diaphragm is distributed over a plurality of individual screening elements positioned in common planes, but independent from each other; or diaphragm arrangements are used which are radially symmetric, so that due to a radially symmetrical intensity the uniformity of illumination is maintained.

With these and other objects in view, the invention resides in certain novel constructions and arrangements and combinations of parts, described by way of examples in the following specification and illustrated diagrammatically in the accompanying drawings, which latter show a few embodiments of the invention.

In said drawing:

Fig. 1 illustrates an illuminating arrangement for an enlarging and copying device in which the light influencing means is mounted between the negative and the enlarging objective.

Fig. 2 illustrates another arrangement in which a diffused source of light is used and the light influencing means is mounted between the source of light and the condenser lens system.

Fig. 3 illustrates still another illuminating arrangement employing two condensing lens systems.

Fig. 4 illustrates diagrammatically a pair of diaphragm discs which may be used in the illuminating arrangements of the invention.

Fig. 5 illustrates diagrammatically a modified construction of a pair of diaphragms.

Fig. 6 illustrates diagrammatically a set of three diaphragms which may be used in the illuminating arrangements of Figs. 2 and 3, and Fig. 7 illustrates diagrammatically another pair of diaphragm discs.

The invention is by no means limited to the illuminating devices disclosed in the Figs. 1 to 3, but others may be used together with the diaphragms of the present invention.

According to Fig. 1 an image of the luminous filament 15 of the clear glass lamp 14 is produced by the condenser lens system 16 in the neighborhood of the enlarging objective 17 at 18. In front of the condenser lens system 16 is arranged the negative 19 or the picture window respectively. Two diaphragms 20 and 21 respectively, which are relatively adjustable to each other are mounted approximately in the plane in which the image 18 of the luminous filament 15 is produced by the condenser 16. The copying material is indicated at 22.

In the embodiment disclosed in Fig. 2 the source of light consists of an opal glass lamp 24 or a lamp provided with a ground glass plate in front of it. The first diaphragm 20 is mounted directly in front of the lamp 24 and the second diaphragm 21 is mounted directly in front of the first diaphragm 20. An annular diaphragm 25 (for instance an iris diaphragm) is concentrically arranged around the diaphragm 20. The other optical members are arranged in the same manner as in Fig. 1.

Fig. 3 illustrates an embodiment in which the condenser 26 illuminated by the source of light is reproduced by a second condenser lens system 27 in the neighborhood of the enlarging objective 17. If the source of light consists of a clear glass lamp 14 as shown, it may be advisable to make one face of the condenser 26 frosted as indicated at 28. A central diaphragm 20 and an outer annular diaphragm 25 are positioned between the two lenses of the condenser 26. The second central diaphragm 21 is arranged either directly in front or in rear of the diaphragm 20.

The diaphragms 20, 21 and 20ª, 21ª may consist of symmetric sectors as illustrated in Figs. 4 and 5 respectively.

Fig. 6 discloses two symmetric central diaphragms 20ᵇ and 21ᵇ, of which one is surrounded by an annular diaphragm 25.

In order to change the proportion of the two types of light with respect to each other the diaphragms just described are arranged so as to be rotatably adjustable with respect to each other as indicated by the arrows.

Fig. 7 illustrates diaphragms 20ᶜ and 21ᶜ of checker board formation which for the purpose of influencing the printing light may be rotatably adjusted or laterally displaced with respect to each other.

The above disclosed diaphragms are made of opaque material, however, it is also possible to make the same of some selective light absorbing material, for instance colored glass or colored Celluloid, so that only the photo chemically active light rays are influenced. This has the advantage that first the entire non-actinic rays of light may be used for focussing the picture on the printing material, and then the contrasts may be gradated by adjusting the diaphragms.

What I claim is:

1. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least two coadjacent diaphragms of opaque material arranged in the path of said beam of light, said diaphragms being provided with congruent sector-shaped cut-outs and being adapted to be rotatably adjusted in their respective planes relatively to each other and at a right angle with respect to the optical axis of the device for progressively varying the intensity proportion of the two mentioned types of light.

2. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least two coadjacent disc-shaped diaphragms of opaque material arranged in the path of light, between said source of light and said support, said diaphragms being provided with congruent and symmetrically arranged cut-outs and being adapted to be adjusted in their respective planes relatively to each other at a right angle with respect to the optical axis of the device for progressively varying the intensity proportion of the two mentioned types of light.

3. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least two coadjacent disc-shaped diaphragms of opaque material arranged in the path of light, between said source of light and said support, said diaphragms being provided with congruent and symmetrically arranged cut-outs and being adapted to be adjusted in their respective planes relatively to each other at a right angle with respect to the optical axis of the device for progressively varying the intensity proportion of the two mentioned types of light, said disc-shaped diaphragms being of a size and positioned at such a point of the optical axis that the image formed from said diaphragms in the enlarging objective fills out the entire diaphragm aperture of the latter.

4. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including two coadjacent circular disc-shaped diaphragms of opaque material arranged in the path of light between said source of light and said support, said circular diaphragms being provided with congruent and symmetrically arranged sector-shaped cut-outs and being adapted to be rotatably adjusted relatively to each other about the optical axis of the device for progressively varying the intensity proportion of the two mentioned types of light.

5. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including two coadjacent circular disc-shaped diaphragms of opaque material arranged in the path of light between said source of light and said support, and a variable iris diaphragm in the plane of one of said disc-shaped diaphragms, the largest aperture to which said iris diaphragm is adjustable being substantially larger than the outer fixed diameter of said disc-shaped diaphragms, said circular diaphragms being provided with congruent and symmetrically arranged sector-shaped cut-outs and being adapted to be rotatably adjusted relatively to each other about the optical axis of the device, said three mentioned diaphragms being provided for progressively varying the intensity proportion of the two mentioned types of light.

6. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including two coadjacent circular disc-shaped diaphragms of opaque material arranged in the path of light between said source of light and said support, said circular diaphragms being provided with congruent and symmetrically arranged sector-shaped cut-outs and being adapted to be rotatably adjusted relatively to each other about the optical axis of the device for progressively varying the intensity proportion of the two mentioned types of light, said disc-shaped diaphragms being of a size and positioned at such a point of the optical axis that the image formed from said diaphragms in the enlarging objective fills out the entire diaphragm aperture of the latter.

7. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including two coadjacent circular disc-shaped diaphragms of opaque material arranged in the path of light between said support and said enlarging objective, said circular diaphragms being provided with congruent and symmetrically arranged sector-shaped cut-outs and being adapted to be rotatably adjusted relatively to each other about the optical axis of the device for progressively varying the intensity proportion of the two mentioned types of light.

8. In an enlarging and copying device, the combination, a source of diffused light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including two coadjacent circular disc-shaped diaphragms of opaque material arranged in the path of light between said source of diffused light and said condenser lens system, and a variable iris diaphragm in the plane of one of said disc-shaped diaphragms, the largest aperture to which said iris diaphragm is adjustable being substantially larger than the outer fixed diameter of said disc-shaped diaphragms, said circular diaphragms being provided with congruent and symmetrically arranged sector-shaped cutouts and being adapted to be rotatably adjusted relatively to each other about the optical axis of the device, said three mentioned diaphragms being provided for progressively varying the intensity proportion of the two mentioned types of light.

HANS SAUER.